US006707631B1

(12) United States Patent
Haddock

(10) Patent No.: US 6,707,631 B1
(45) Date of Patent: Mar. 16, 2004

(54) FLYING-TYPE DISK DRIVE SLIDER WITH WEAR PAD

(75) Inventor: Quinn J. Haddock, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 0 days.

(21) Appl. No.: 09/528,686

(22) Filed: Mar. 20, 2000

(51) Int. Cl.$^7$ .............................................. G11B 21/02
(52) U.S. Cl. .................. 360/75; 360/234.7; 360/235.8; 360/236.3; 29/603.03; 29/90.01
(58) Field of Search ................... 360/75, 70, 235.8, 360/235.9, 236.6, 236.7, 234.7, 236.3; 29/603.03, 90.01

(56) References Cited

U.S. PATENT DOCUMENTS

| 3,823,416 | A | | 7/1974 | Warner ....................... 360/122 |
| 4,669,011 | A | | 5/1987 | Lemke ....................... 360/103 |
| 4,692,832 | A | | 9/1987 | Bandara et al. ............. 360/137 |
| 4,845,816 | A | | 7/1989 | Nanis ......................... 29/90.01 |
| 5,041,932 | A | | 8/1991 | Hamilton ................... 360/104 |
| 5,168,413 | A | * | 12/1992 | Coker et al. ................ 360/137 |
| 5,255,141 | A | | 10/1993 | Valstyn et al. ............. 360/126 |
| 5,396,387 | A | | 3/1995 | Murray ...................... 360/103 |
| 5,408,373 | A | * | 4/1995 | Bajorek et al. ........... 360/244.3 |
| 5,420,735 | A | | 5/1995 | Haines ....................... 360/103 |
| 5,455,730 | A | | 10/1995 | Dovek et al. .............. 360/113 |
| 5,535,073 | A | | 7/1996 | Brezoczky et al. ......... 360/105 |
| 5,550,691 | A | | 8/1996 | Hamiton .................... 360/103 |
| 5,610,784 | A | | 3/1997 | Dorius et al. .............. 360/103 |
| 5,623,383 | A | | 4/1997 | Gregory et al. ............ 360/103 |
| 5,632,669 | A | * | 5/1997 | Azarian et al. .............. 451/54 |
| 5,650,892 | A | | 7/1997 | Dorius et al. .............. 360/103 |
| 5,659,447 | A | * | 8/1997 | Gregory et al. ............ 360/237 |
| 5,673,156 | A | | 9/1997 | Chen et al. ................ 360/97.01 |
| 5,710,683 | A | | 1/1998 | Sundaram .................. 360/126 |
| 5,734,519 | A | * | 3/1998 | Fontana et al. ........... 360/97.01 |
| 5,754,367 | A | | 5/1998 | Chang et al. .............. 360/103 |
| 5,768,055 | A | | 6/1998 | Tian et al. ................. 360/103 |
| 5,822,153 | A | | 10/1998 | Lairson et al. ............. 360/104 |
| 5,864,241 | A | | 1/1999 | Schreck et al. ............ 324/699 |
| 5,872,685 | A | | 2/1999 | Park et al. ................. 360/103 |

(List continued on next page.)

FOREIGN PATENT DOCUMENTS

JP          05028414 A    *   2/1993    ........... G11B/5/127

*Primary Examiner*—Andrew L. Sniezek
*Assistant Examiner*—Jason Olson
(74) *Attorney, Agent, or Firm*—Marsh Fischmann & Breyfogle LLP

(57) ABSTRACT

A flying slider is disclosed for a rigid disk drive application. The slider includes a wear pad disposed at least substantially at its trailing edge on a lower surface thereof. An appropriate transducer(s) is typically embedded within this wear pad. One or more air bearing surfaces are disposed on the lower surface of the slider as well for allowing the slider to fly relative to the disk. At least one of these air bearing surfaces is disposed close to this wear pad, but is separated therefrom by a recess which is of a depth so as to not have the wear pad function as an air bearing surface. On the initial operation of the disk drive with the described slider therein, the uplifting forces applied to the slider by the noted air bearing surfaces are insufficient to dispose the wear pad above the glide avalanche of the disk or to fly the slider such that the wear pad is disposed above the glide height. Therefore, the wear pad is burnished in the initial operation of the disk drive and typically prior to releasing the disk drive for distribution. Burnishing of the wear pad continues until a small space develops between the wear pad and the disk (e.g., slightly above the glide height). Once burnishing operations are completed, the wear pad is no longer subjected to any substantial wearing or burnishing, and the fly height of the slider is only slightly greater than the glide height which enhances the exchange of signals between the transducer(s) and disk.

45 Claims, 3 Drawing Sheets

U.S. PATENT DOCUMENTS

| | | |
|---|---|---|
| 5,898,542 A | 4/1999 | Koshikawa et al. ......... 360/103 |
| 5,909,340 A | 6/1999 | Lairson et al. .............. 360/104 |
| 5,948,532 A | 9/1999 | Hwang et al. .............. 428/408 |
| 5,949,612 A * | 9/1999 | Gudeman et al. ........ 360/97.01 |
| 5,995,324 A | 11/1999 | Haddock et al. ............ 360/103 |
| 6,160,683 A * | 12/2000 | Boutaghou ............... 360/237.1 |
| 6,252,742 B1 * | 6/2001 | Kameyama ................. 360/237 |
| 6,359,433 B1 * | 3/2002 | Gillis et al. ................. 324/210 |
| 6,493,184 B1 * | 12/2002 | Smith ......................... 360/135 |

* cited by examiner

FLYING-TYPE DISK DRIVE SLIDER WITH WEAR PAD

FIELD OF THE INVENTION

The present invention generally relates to the field of disk drives and, more particularly, to sliders for disk drives which are designed to fly above a rigid magnetic recording disk of the disk drive during disk drive operations.

BACKGROUND OF THE INVENTION

One way to characterize the manner in which information is recorded to and/or read from a rigid, magnetic, computer-readable storage medium (e.g., a disk) is the manner in which the magnetic recording head interfaces with the disk. Contact recording has at least been proposed to place the head and disk in direct physical contact when exchanging signals therebetween. Theoretically this maximizes the performance of the head and disk at least in relation to reading information from and writing information to the disk. Other issues have kept contact recording systems from realizing commercial success. Constant contact between the head and disk presents both wear and contamination (e.g., through generation of particulates) issues which need to be addressed by the disk drive design. Heat generated by the continuous contact between the head and disk during disk drive operations can also have an adverse effect on the accuracy of the exchange of information between the head and disk (e.g., via thermal transients or asperities). Frictional forces from the contact between the recording head and disk can also cause data transfer problems in the form of track misregistrations, as well as bit shift or jitter caused by suspension and/or air-bearing resonance excitations.

Another approach which has been utilized in commercial disk drive designs is for the magnetic recording head to fly above the surface of the rigid, magnetic disk. Typically the magnetic recording head includes a slider with a magnetic recording and/or writing element(s) carried thereby. One or more air-bearing surfaces are included on the lower surface of the slider which project at least generally toward the disk. These air-bearing surfaces are shaped/oriented on the slider body so that the boundary layer of air which is carried by the rigid disk during rotation thereof is compressed and forced to flow underneath the slider. Rotation of the disk in excess of a certain velocity will generate sufficient forces on the air bearing surfaces to lift the slider above the surface of the disk toward which the air-bearing surfaces at least generally project.

Relatively significant development efforts have been directed to the design of the air-bearing surfaces of sliders of the flying type. The problems which have been addressed by these efforts have not been simply to realize flying of the slider in spaced relation to the disk, but instead to considerations such as attempting to accurately control the fly height or to achieve a consistent fly height. Another area of focus has been to attempt to minimize the spacing between the head and disk during disk drive operations without actually having any significant contact which can have adverse effects on data transfer operations, as well as the operability of the disk drive or components thereof. Current state-of-the art, commercially available disk drives with MR/GMR heads operate with an average fly height of about 30 nanometers. However, this does not correspond with a 30 nanometer spacing between the magneto-resistive recording element and the disk. Pole-tip recession typically adds another 5–7 nanometers to the actual spacing being the recording element and the disk, as does the carbon overcoat which is typically included on the bottom surface of current flying sliders. Reducing the spacing between the flying head and rigid, rotating disk would be desirable to realize higher bit and track densities.

SUMMARY OF THE INVENTION

The present invention is generally directed to sliders which fly above a rotating, rigid computer-readable storage medium in a disk drive. Hereafter, this will be characterized as a "disk." More specifically, the present invention is generally directed to a flying slider having a wear pad which is disposed typically at least substantially adjacent to a trailing edge of the slider and which will typically carry the sensor(s) or transducer(s) which operatively interface with the disk to read and/or write information therefrom/thereto. This wear pad is burnished during the initial operation of the disk drive to create a small gap between the slider and the disk which is in effect customized to the disk drive at issue. Principles of the present invention may be used in both contact start/stop type disk drive designs, and well as in load/unload type disk drive designs.

A first aspect of the present invention is embodied in a method for operating a disk drive which includes a rigid disk and a slider. A wear pad is disposed on a lower surface of the slider or that surface which at least generally projects toward the disk. The method includes executing a first flying step which in turn includes flying the slider a distance above the disk which is no more than the glide height or within the glide avalanche of the disk. The term "glide height" means a spacing between the disk and slider such that the slider contacts at least part of the disk (e.g., its upper surface roughness) during relative movement between the slider and disk (e.g., by rotation of the disk). While the slider is flying above the disk a distance which is no more than the glide height, the wear pad is burnished (e.g., material is removed from the wear pad). Burnishment of the wear pad is terminated and some time thereafter a second flying step is initiated, which may be immediately after the wear pad has been burnished to an appropriate degree. The slider thereafter flies above the disk a distance which is typically only slightly greater than the glide height during this second flying step such that the slider and disk remain in preferably constant spaced relation.

Various refinements exist of the features noted in relation to the subject first aspect of the present invention. Further features may also be incorporated in the subject first aspect of the present invention as well. These refinements and additional features may exist individually or in any combination. The lower surface of the slider may include at least one air bearing surface and a lifting force may be exerted thereon by rotation of the disk. While the wear pad is being burnished, the lifting forces are insufficient to dispose the slider above the disk a distance which is in excess of the glide height. Once the wear pad has been burnished, however, the lifting forces exerted on the air bearing surface (s) of the slider are sufficient so as to dispose the slider above the disk a distance which is typically slightly in excess of the glide height. Stated another way, while the disk is being rotated at a certain velocity, the slider is maintained at substantially a constant distance above the disk. This distance is selected such that the wear pad will contact the disk and will be burnished by this contact and relative movement between the disk and wear pad. Sufficient burnishment of the wear pad will eventually create a typically small gap between the slider and the disk while the disk continues to be rotated at the same velocity. Burnishing the wear pad in this manner thereby provides a typically very small gap between the slider and disk, which in turn yields a fly height of significantly reduced magnitude in relation to the known prior art. In one embodiment, the fly height is no more than about 5–6 nanometers above the mean plane of the surface roughness of the disk (i.e., the 5–6 nanometers includes the glide avalanche). Another way of characterizing this significantly reduced fly is that the fly height in relation to the subject first aspect of the present invention is only slightly greater than the glide avalanche. By disposing the read and/or write sensor in the wear pad associated with this first aspect of the present invention, the spacing between the same and the disk is also thereby reduced which enhances the operative interface therebetween (e.g., the exchange of signals to read and/or write). This gap is also customized in that the lower extreme of the wear pad is burnished into a surface which is at least substantially co-planar with the disk while the slider is flying relative to the disk.

Preferably the wear pad of the subject first aspect of the present invention is not an air bearing surface such that the burnishment thereof does not have any affect on the fly height of the slider (e.g., no greater than about 1% of the lift forces exerted on the slider during disk drive operations may be attributed to the presence of the wear pad). Typically the wear pad will be disposed at least substantially at a "trailing edge" of the slider as that term is commonly used in the art. Burnishment of the wear pad is desired, not the air bearing surfaces. This may be affected by disposing the slider at a relatively steep pitch relative to the disk during disk drive operations (e.g., at least about 150 microradians).

The transducer(s) or sensor(s) which is used to read and/or write information from/to the disk may be embedded within the slider before burnishment is undertaken in accordance with the subject first aspect of the present invention. That is, at least some wear pad material initially may be disposed between the sensor(s) and the disk. The method of the subject first aspect may further include burnishing the wear pad until there is no longer any wear pad material between the sensor(s) and the disk. Another way of characterizing this feature of the subject first aspect is that the wear pad is burnished so as to eventually expose the sensor(s) to the air gap which exists between the slider and disk during disk drive operations after what may be characterized as an initialization operation of sorts for the disk drive. Wear pad material may be burnished away in accordance with the foregoing, as well as an overcoat that is typically disposed on the lower surface of the slider at the completion of the manufacturing thereof.

Burnishment of the wear pad in accordance with the subject first aspect may be monitored in at least some respect. For instance, a read/write signal between the sensor (s) and the disk will include "noise" or other "spikes" while there is contact between the slider and the disk. When the gap is defined between the slider and the disk by the subject burnishment, this "noise" will no longer be evident in the signal between the sensor(s) and the disk. This may be used as an indication that the burnishing operation may be terminated. In this regard, the burnishment of the wear pad in accordance with the subject first aspect will typically be done at the manufacturer's facilities. By monitoring the above-noted signal, the point in time when the gap is initially established between the entirety of slider and the disk may be identified such that the current operation may be terminated. Relatedly, after the wear pad has been burnished in accordance with the first aspect of the invention, the disk drive may be released for distribution (e.g., to consumers or end users), although other tests or the like may first need to be executed.

The burnishing operation of the subject first aspect may be executed rather expediently so as to not significantly add to the time required to prepare a disk drive for release for distribution to consumers. In one embodiment, a gap may be established between the slider and the disk in no more than about 60 minutes, and in another embodiment in no more than about 10 minutes. This fast burnishing may be facilitated by forming the wear pad from a relatively soft material in comparison to the air bearing surface(s) which are also disposed on the lower surface of the slider (e.g., the hardness of the portion of the slider which is the wear pad may have a smaller hardness value than those portions of the slider which define the air bearing surfaces). Appropriate materials for the wear pad include alumina, while appropriate materials for the air bearing surfaces used by the slider include ceramics such as a composition of alumina and titanium carbide.

A second aspect of the present invention is embodied in a method for operating a disk drive which includes a rigid disk and a slider. The slider includes at least one transducer which operatively interfaces with the disk to read and/or write information from/to the disk, as well as at least one air bearing surface and a wear pad which are disposed on a lower surface of the slider which at least generally projects toward the disk during disk drive operations. The method of the second aspect includes initializing the disk drive. Initialization of the disk drive includes rotating the disk relative to the slider and exerting a lifting force on the slider by the action of the air associated with the rotating disk on the air bearing surface(s) of the slider. During this initialization operation there is contact between the wear pad and the disk at least at some point in time. This contact and the relative movement between the disk and the slider burnishes the wear pad. Sufficient burnishment of the wear pad establishes a typically small gap between the slider and the disk, and thereafter there is no longer any substantial burnishment of the wear pad. That is, once the initialization operation is complete, there is no longer any substantial burnishment of the wear pad. At least one data transfer operation is executed after the disk drive has been initialized in accordance with the foregoing, although data transfer operations could be executed during the initialization procedure as well. Data transfer operations are affected by rotating the disk relative to the slider, maintaining a gap between the slider and a disk which again was provided by the burnishment of the wear pad in the initialization procedure, and exchanging at least one signal between at least one of the transducer(s) carried by the slider and the disk. The various features discussed above in relation to the first aspect of the present invention may be incorporated in this second aspect of the present invention as well, and in the manner noted above.

A third aspect of the present invention is embodied in a method for operating a disk drive which includes a rigid disk and a slider. The slider includes at least one transducer which operatively interfaces with the disk to read and/or write information from/to the disk, as well as at least one air bearing surface and a wear pad which are disposed on a lower surface of the slider which at least generally projects toward the disk during disk drive operations. Notably, this transducer is initially embedded within the wear pad. The method of the third aspect includes the steps of rotating the disk, burnishing the wear pad at least at some point in time during this rotation, exposing the noted transducer through this burnishing operation, and flying the slider relative to the disk during the rotation thereof. The exposure of the noted transducer means that there is no structural material between the transducer and disk. Stated another way, the transducer directly interfaces with the air gap between the slider and the disk. The various features discussed above in relation to the first aspect of the present invention may be incorporated in this third aspect of the present invention as well, and in the manner noted above.

A fourth aspect of the present invention is embodied in a slider for a disk drive which includes a rigid disk. The slider of the subject fourth aspect is of the "flying type." In this regard, the slider includes a slider body which may be characterized as extending along a reference axis to define a longitudinal extent of the slider body. The slider body includes upper and lower surfaces, with the lower surface at least generally projecting toward the disk of the disk drive when installed therein. The slider body further includes a leading edge and trailing edge as those terms are commonly used in the art and which would be longitudinally spaced relative to the above-noted reference axis. Other portions of the slider body include a pair of sides which are laterally spaced relative to the above-noted reference axis and which extend longitudinally between the leading and trailing edges.

The lower surface of the slider of the subject fourth aspect is designed to have a significantly reduced fly height in comparison to the prior art, and which is typically only slightly more than the glide height as that term is commonly used in the art. In this regard, the lower surface includes a wear pad which is disposed at least substantially at the trailing edge of the slider body, at least one transducer which is carried by this wear pad, and an air bearing surface system (i.e., one or more air bearing surfaces). In one embodiment, the wear pad is separate from and is not part of the air bearing surface system. That is, rotation of the disk relative to the slider of the subject forth aspect of the present invention generates substantially no lifting forces on the slider through the noted wear pad.

Various refinements exist of the features noted in relation to the subject fourth aspect of the present invention. Further features may also be incorporated in the subject fourth aspect of the present invention as well. These refinements and additional features may exist individually or in any combination. The wear pad of the fourth aspect is disposed at least substantially adjacent to the trailing edge of the slider body. In this regard and in one embodiment, the wear pad is disposed about 0.0004 inches from the trailing edge of the slider body. Preferably the wear pad is centrally disposed between the pair of laterally-spaced sides of the slider body. Portions of the lower surface of the slider body which surround the wear pad may be recessed in relation to the wear pad such that the wear pad extends further toward the disk then these adjacent portions (e.g., the wear pad may be characterized as an island of sorts). Relatedly, a recess may be disposed in front of the wear pad (i.e., in the direction of the leading edge of the slider body) and may be of a depth such that the wear pad does not function as an air bearing surface for the slider.

Characterization of the wear pad as such is not necessarily meant to functionally define the wear pad for all-time. Instead, the wear pad of the subject fourth aspect may indeed function as a wear pad between the slider and the disk during only an initial portion of disk drive operations and in a manner contemplated by the first, second, and third aspects noted above. That is, after an initial burnishing of the wear pad the first time the disk drive is operated, the function of the wear pad is effectively limited to being a carrier for the transducer(s) for operatively interfacing with the disk (e.,g., a structure on which the transducer(s) is mounted).

The air bearing surface system of the subject fourth aspect may include a first air bearing surface. This first air bearing surface may be disposed relatively close to the wear pad. In one embodiment, this first air bearing surface and the wear pad are separated by the above-noted recess which provides non-air bearing surface characteristics for the wear pad. Preferably the first air bearing surface and the wear pad are spaced by a distance of no more than about 0.010 inches, and in one embodiment are spaced by a distance of about 0.003 inches, as measured along a line which is parallel with the above-noted reference axis which again defines the longitudinal extent of the slider. Stated another way, the first air bearing surface and the wear pad are spaced by a distance which is within a range of about 5% to about 20% of the length of the slider. Another characterization of the "closeness" of the noted first air bearing surface and the wear pad is that they may be characterized as being disposed on the same half of the slider body. "Half" in this context is in relation to the longitudinal extent of the slider body, or the half-way point between the leading edge and trailing edge of the slider body. Therefore, in the subject characterization both the wear pad and the first air bearing surface would be disposed on that part of the lower surface of the slider body which extends from the trailing edge to the longitudinal midpoint of the slider body. Other air bearing surfaces may be disposed on this half as well and/or one or more air bearing surfaces may be disposed on the opposite half of the slider body as well (e.g., more toward the leading edge).

DETAILED DESCRIPTION OF THE INVENTION

Figure 1:
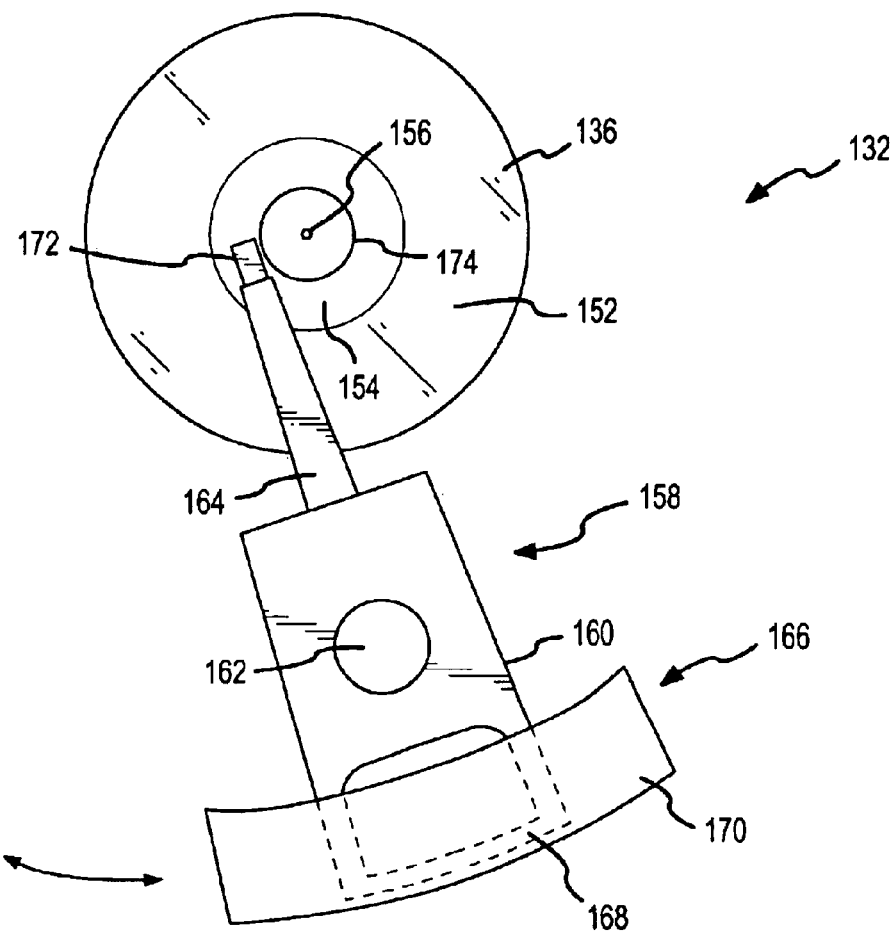
FIG. 1 is a top view of one embodiment of a disk drive.

The present invention will now be described in relation to the accompanying drawings which least assist in illustrating its various pertinent features. One embodiment of a disk drive 132 which may utilize principles of the present invention is presented in FIG. 1. The disk drive 132 includes one or more typically horizontally disposed disks 136 which will typically be disposed in spaced and parallel relation. Each disk 136 preferably includes one, and possibly a pair of opposingly disposed, read/write surfaces 152 on which information may be stored and retrieved. Another portion of each disk 136 is a landing zone 154 for the case where the disk drive 136 is of a contact start/stop type design. One way to characterize these disks 136 is as a computer-readable storage medium (e.g., having a plurality of concentrically disposed tracks on each of the read/write surfaces 152). The disk(s) 136 is mounted on typically an at least generally vertically disposed spindle 174 for rotation about an axis 156 which is coincident with the spindle 174.

Information may be read from one or more of the disks 136, and preferably written to these disks 136, by a read/ write assembly 158 of the disk drive 132. The read/write assembly 158 includes an actuator arm or actuator block 160 (e.g., "E-block") which is pivotally interconnected with the support structure of the disk drive 132 (e.g., its encasement) via a hub 162. Typically the actuator arm 160 is designed as a rigid structure such that there is at least substantially no deflection of the actuator arm 160 or any portion thereof under normal operating conditions. Movement of the actuator arm 160 is affected through a rotary actuator 166 which includes a coil 168 mounted on the actuator arm 160 and a magnet 170 which is maintained in fixed relation relative to the actuator arm 160. This arrangement is commonly referred to as a voice coil or a voice coil motor.

Extending from the actuator arm 160 is at least one load beam 164 which is appropriately interconnected with the actuator arm 160 (e.g., via staking of the load beam(s) 164 to an actuator arm tip on the actuator arm 160). One load beam 164 will be provided for each of the read/write surfaces 152 utilized by the disk drive 132. Each load beam 164 includes a hinge/spring assembly (not shown) to bias the load beam 164 toward its corresponding disk 132 and for allowing controlled flexure of the load beam 164 during operation of the disk drive 132. Disposed on an end portion of each of the load beams 164 is a head or head gimble assembly 172 which is able to read information from the corresponding disk 132, and preferably which is further capable of writing information to this disk 132 as well. Flexure of the load beam(s) 164 through their corresponding hinge/spring assembly is utilized to allow their corresponding head 172 to move away from their corresponding disk 132 to a predetermined position of sorts or to accurately maintain the fly height of the head 172 (i.e., distance of the head(s) 172 from their corresponding disk 132) during operation of the disk drive 132. Both the rotational speed of the disk(s) 132 (which directs the head(s) 172 away from their corresponding disk 132) and the flexure of the corresponding load beam 164 through its hinge/spring assembly (which again biases the corresponding head 164 towards the disks 132) cooperate to determine the fly height of the head(s) 172.

Figure 4:
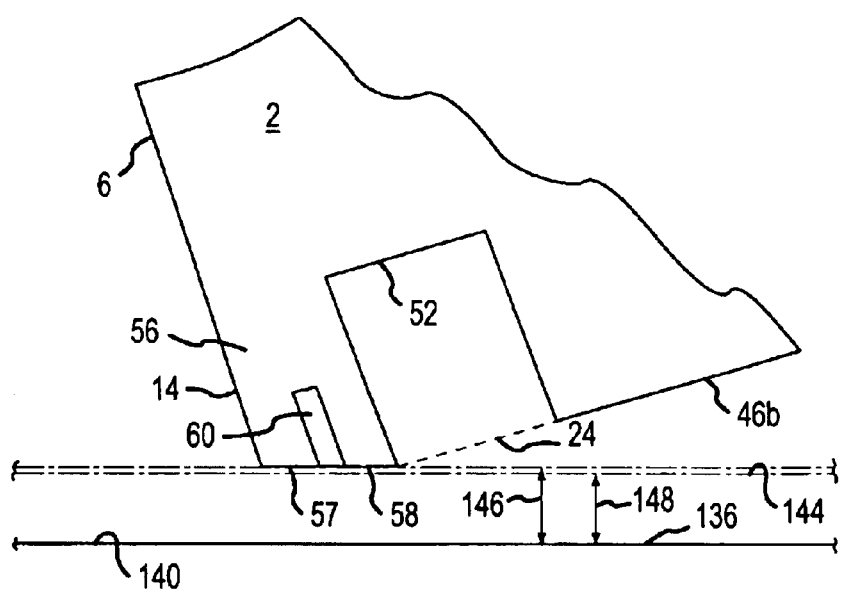
FIG. 4 is a partial, longitudinal cutaway view of the slider of FIG. 3 after the burnishing operation on the rear wear pad of the slider has been completed.
Figure 2:
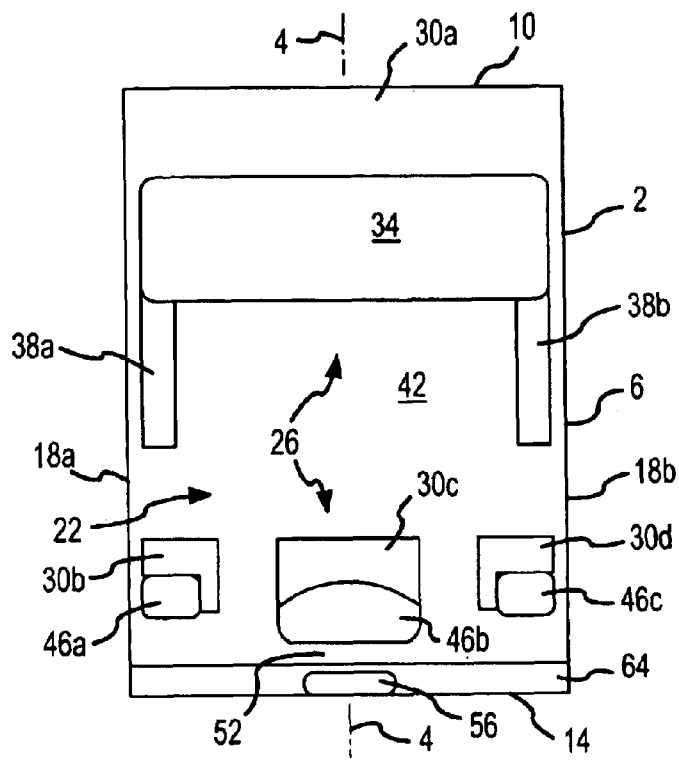
FIG. 2 is a bottom view of one embodiment of a slider which may be used by the disk drive FIG. 1, namely for a contact start/stop type design.
Figure 3:
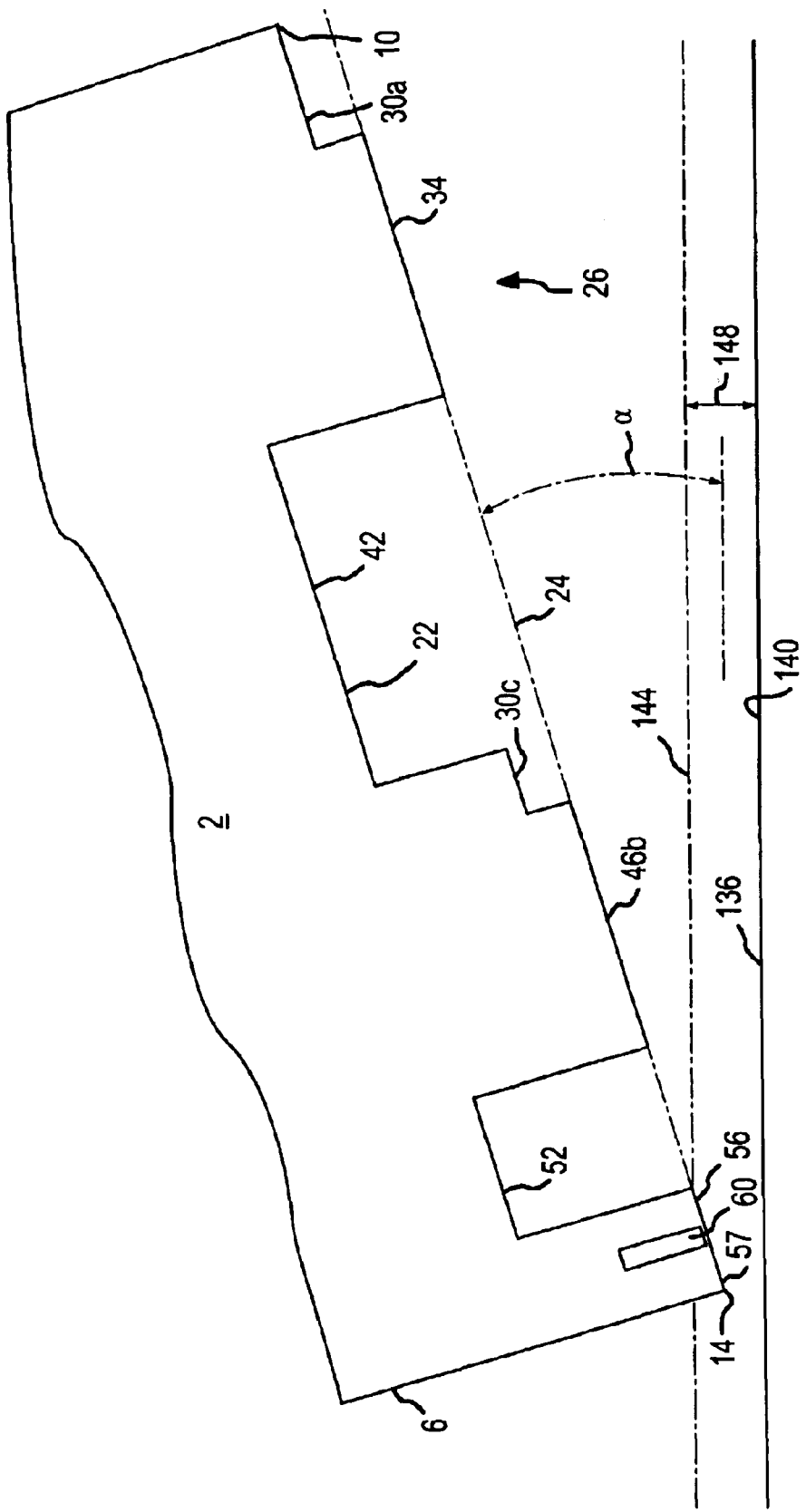
FIG. 3 is a longitudinal cutaway view of the slider of FIG. 2 prior to conducting a burnishing operation on a rear wear pad of the slider.

FIGS. 2–4 depict a slider 2 which may be used by the head 172 of the disk drive 132 of FIG. 1. The slider 2 is designed for use with contact start/stop type designs. The slider 2 includes a slider body 6 which has a longitudinal extent along a central reference axis 4. Hereafter in relation to the slider 2 the term "longitudinal" or the like means in a direction which is parallel with this reference axis 4, while the term "lateral" or the like means a direction which is perpendicular with this reference axis 4. An at least generally rectangular configuration or profile is utilized by the slider body 6. In this regard, the slider body 6 includes: a leading edge 10 which is laterally extending; a trailing edge 14 which is laterally extending and which is longitudinally spaced from the leading edge 10 (i.e., spaced from the leading edge 10 along the reference axis 4); and a pair of sides 18a and 18b which are laterally spaced and extend longitudinally between the leading edge 10 and trailing edge 14. Orientations for the leading edge 10, the trailing edge 14, and the sides 18a, 18b which differ from that illustrated in FIG. 2 may be appropriate (e.g., a square configuration).

The slider body 6 includes a lower surface 22 which at least generally projects toward its corresponding disk 136 when installed in the disk drive 132. Features are incorporated in the design of the lower surface 22 of the slider 2 such that its fly height is significantly smaller than current state-of-the-art slider designs, and is only slightly in excess of the glide height 148 (e.g., FIG. 4). Spacing between the slider 2 and the disk 136 is maintained during normal disk drive operations (e.g., reading/writing information from/to the disk 136) by including an air bearing surface or ABS system 26 on the low surface 22 of the slider body 6. The ABS system 26 includes a front air bearing surface or ABS pad 34 which has an at least generally rectangular profile. The front ABS pad 34 is longitudinally spaced from the leading edge 10 and extends at least substantially from the side 18a of the slider body 6 to the side 18b. A small space is typically included between the front ABS pad 34 and each of the sides 18a, 18b in the illustrated embodiment for manufacturing purposes. All of the front ABS pad 34 is disposed on the forward half of the slider body 6 (i.e., the front ABS pad 34 is disposed between the leading edge 10 of the slider body 6 and the longitudinal midpoint of the slider body 6).

Air carried by the rotating disk 136 is directed under the front ABS pad 34 to exert an upwardly directed lifting force thereon via an ABS step 30a. The ABS step 30a is disposed forward of the front ABS pad 34, or in the direction of the leading edge 10, such that the ABS step 30a is disposed between the leading edge 10 and the front ABS pad 34. As illustrated in FIG. 3, the front ABS pad 34 may be characterized as being disposed within a reference plane 24. The ABS step 30a is recessed relative to this reference plane 24 by a distance which allows the front ABS pad 34 to function as an air bearing surface.

A pair of longitudinally extending and laterally spaced rails 38a, 38b extend from the rear of the front ABS pad 34 toward, but not to, the trailing edge 14 of the slider body 6. These rails 38a, 38b are also slightly spaced from the sides 18a and 18b, respectively, in the same manner as the front ABS pad 34. The rails 38a, 38b terminate at least generally proximate the longitudinal midpoint of the slider body 8 and are recessed relative to the reference plane 24 as well, although not to the same extent as the ABS step 30a. An ABS cavity 42 is defined by the rails 38a, 38b and the front ABS pad 34. Air which flows over the front ABS pad 34 flows over the ABS cavity 42 to generate a negative pressure therein which may be used to have an effect upon and/or control the flight of the slider 2. Those portions of the lower surface 22 which define the bottom of the ABS cavity 42 are recessed relative to the reference plane 24, and thereby relative to the front ABS pad 34, by an amount which is sufficient so as to allow the noted negative pressure to be generated therein.

A plurality of rear air bearing surfaces or ABS pads 46a–c are longitudinally spaced from the front ABS pad 34, and are separated therefrom by the ABS cavity 42. The rear ABS pad 46b is centrally disposed between the sides 18a and 18b of the slider body 6 (e.g., the reference axis 4 the rear ABS pad 46b). The rear ABS pad 46a is laterally spaced from the rear ABS pad 46b in that it is disposed at least generally between the side 18a and the rear ABS pad 46b. Similarly, the rear ABS pad 46c is laterally spaced from the rear ABS pad 46b in that it is disposed at least generally between the side 18b and the rear ABS pad 46b. The rear ABS pads 46a and 46b are slightly longitudinally spaced from the rear ABS pad 46b in the direction of the leading edge 10 to provide roll stiffness for the slider 2. Air carried by the rotating disk 136 is directed under the rear ABS pads 46a, 46b, and 46c to exert an uplifting force thereon by corresponding ABS steps 30b, 30c, and 30d, respectively. The ABS steps 30b, 30c, and 30d are disposed forward of their corresponding rear ABS pad 46a, 46b, and 46c, respectively, or in the direction of the leading edge 10, such that the ABS steps 30b, 30c, and 30d are disposed between the leading edge 10 and the corresponding rear ABS pad 46a, 46b, and 46c, respectively. The steps 30b and 30c also extend around and along most of the inside edge (i.e., the side of the pads 46a and 46c which is closest to the reference axis 4) of their corresponding rear ABS pad 46a and 46c, respectively. As illustrated in FIG. 3, the rear ABS pads 46a, 46b, and 46c may also be characterized as being disposed within the reference plane 24. The ABS steps 30b, 30c, and 30d are each recessed relative to this reference plane 24 by a distance which allows the rear ABS pad 46a–c to function as air bearing surface surfaces.

Located at least substantially at the trailing edge 14 of the slider body is a rear rail 64. The rear rail 64 is longitudinally spaced from each of the rear ABS pads 46a–c, extends laterally between the sides 18a and 18b, and is recessed relative to the reference plane 24. Centrally disposed on the rear rail 64 is a wear pad 56 which carries at least one transducer 60 for reading information from and/or writing information to the disk 136 in a manner known in the art (e.g., through sending signals between the transducer(s) 60 and the disk 136, such that there is an operative interface of sorts therebetween). Representative transducers 60 include magneto resistive (MR), giant magneto resistive (GMR), collosal MR, and older inductive transducers.

Prior to initialization of the disk drive 132, the wear pad 56 is contained within the above-noted reference plane 24 (FIG. 3), and is thereby co-planar with the rear ABS pads 46a–c and the front ABS pad 34. Burnishing operations are executed on the wear pad 56 when the disk drive 132 is initially operated so as to remove portions of the wear pad 56. Therefore, preferably the wear pad 56 is formed from a softer material than those which formed the front ABS pad 34 and the rear ABS pads 46a–c. In one embodiment, that portion of the slider body 6 which includes the front ABS pad 34 and the rear ABS pads 46a–c is formed from materials such as $Al_2O_3$—TiC or other appropriate ceramics, while the material which forms the wear pad 56 is formed from materials having a reduced hardness, such as $Al_2O_3$.

Substantially no uplifting forces are applied to the slider 2 by the wear pad 56 (e.g., no more than about 1% of the uplifting forces exerted on the slider 2 are due to the wear pad 56). At no time does the wear pad 56 thereby function as an air bearing surface. This non-air bearing surface effect is provided by disposing a recess 52 between the wear pad 56 and the rear ABS pad 46b. One of the characteristics of the recess 52 that allows the wear pad 56 to initially be coplanar with the front ABS pad 34 and the rear ABS pads 46a–c, and yet still not exert any substantial uplifting forces on the slider 2 is the depth of the recess 52 or the degree of offset from the reference plane 24. Typically the depth of the recess 52 must be at least about 600 nanometers in order for the wear pad 124 to be a non-air bearing surface in the manner described herein. Other characteristics which at least contribute to the wear pad 56 being a non-air bearing surface is its small size which also reduces the time to burnish the same. In one embodiment, the wear pad 56 contributes no more than about 1–2% of the total lift forces exerted on the slider 2 when flying.

There are a number of other characteristics or features which are important in relation to the slider 2. One is the pitch angle at which the slider 2 is disposed when installed in the disk drive 132 and which is represented by the angle a in FIG. 3. Generally, the pitch angle a is selected such that the wear pad 56 will at least at some point in time be in contact with the disk 136, and such that the front ABS pad 34 and the rear ABS pads 46 are never in contact with the disk 132. Another characteristic is that the rear ABS pads 46a–c and the wear pad 56 are disposed on the same half of the lower surface 22 of this latter body 6. Both the rear wear pads 46a–c and the rear wear pad 56 are disposed between a longitudinal midpoint of the slider body 6 (i.e., half-way between the leading edge 10 and the trailing edge 14) and the trailing edge 14 of the slider body 6. The wear pad 56 and the rear ABS pad 46b are also disposed relatively close to each other. In one embodiment, the rear wear pad and the rear ABS pad 46 are separated by a distance of no more than about 0.010 inches (as measured along the to reference axis 4). As noted above, the wear pad 56 is disposed at least substantially at the trailing edge 14 of the slider body 6. In one embodiment, the trailing edge 14 and the wear pad 56 are separated by a distance of about 0.0004 inches, the transducer 60 and the trailing edge 14 are separated by a distance of about 0.0011 inches, the rear ABS pad 46b and the trailing edge 14 or separated by distance of about 0.005 inches, and the rear ABS pad 46b and the wear pad 56 are separated by a distance of about 0.003 inches. Stated another way, preferably the rear ABS pad 46b and the wear pad 56 are separated by a distance which is no more than about 20% of a distance between the leading edge 10 and the trailing edge 14 of the slider body 10, and in one embodiment are separated by a space which is about 5% of a distance between the leading edge 10 and the trailing edge 14 of the slider body 6.

Characterizing the pad 56 as a "wear pad" is not meant to describe the function of the pad 56 for all time. There is no contact between the wear pad 56 and the disk 136 during disk drive operations after the disk drive 132 has undergone an initialization procedure which is on the initial start-up of the disk drive 132, and therefore at least at this time the pad 56 does not provide a "wear" function. Even when there is contact between the wear pad 56 and the disk 136, the primary function of the wear pad 56 is not primarily to protect the slider 2 and/or the disk 136 from this type of situation, but instead is to achieve a reduced fly height 146 for the slider 2 which is greater than the glide height 148. In this regard, when the disk drive 132 is initially assembled and for the subject contact start/stop design, the wear pad 56 will be disposed directly on typically the data portion of the disk 136. Prior to releasing the disk drive 132 for distribution (e.g., to consumers), the disk drive 132 will undergo an initialization procedure on the first start-up of the disk drive 132. The initialization procedure entails rotating the disk 136 to burnish the wear pad 56 to achieve a reduced fly height 146 which is greater than the glide height 148. Both the fly height 146 and glide height 148 are measured relative to a reference plane 140 which corresponds with a mean of the surface roughness of the disk 136. In one embodiment and when the disk 136 has a diameter of about 95 mm, the disk 136 is rotated at a velocity of about 5400 rpm for the subject initialization procedure. Different speeds may be used for the initialization procedure and normal disk drive operations, or the same rotational speed may be used.

At the time of the subject initialization procedure, the uplifting forces being exerted on the front ABS pad 34 and the rear ABS pads 46a–c are insufficient to dispose the entirety of the wear pad 56 above the glide height 148 or above the glide avalanche 144 of the disk 136, and in one embodiment the entire lower extreme 57 of the wear pad 56 is disposed below the glide avalanche 144 of the disk 136. Continued rotation of the disk 136 with the wear pad 56 in this position causes the roughness of the upper surface or the glide avalanche 144 of the disk 136 to burnish the wear pad 56 or remove portions of the material which define the wear pad 56. Burnishing of the wear pad 56 will continue until a burnished surface 58 of the wear pad 56 is disposed above the glide height 148 or glide avalanche 144 of the disk 136. With the wear pad 56 being formed from the above-noted types of materials, the time required to burnish the wear pad 56 to the point where the fly height 146 of the slider exceeds the glide height 148 to achieve separation between the entirety of the slider 2 and the disk 136 during disk drive operations is relatively quick, and in one embodiment takes no more than about 10 minutes.

Burnishing of the wear pad 56 during the initialization procedure allows the entirety of the slider 2 to fly a distance above the disk 132 which is very close to, but slightly in excess of the glide height 148. This reduced spacing is advantageous for the transfer of signals between the transducer 60 and the disk 132 for read/write operations. Other benefits are provided by the burnishment of the wear pad 56 during the initialization procedure for the disk drive 132. One is that the burnished surface 58 of the wear pad 56 (after the burnishing operation) is customized in that the very disk 136 with which the slider 2 is to be used is what does the burnishing. Burnishing of the wear pad 56 by its corresponding disk 136 also provides a burnished surface 58 thereof which is at least substantially co-planar with the disk 136. Another benefit which may be realized through the initialization procedure described herein is that the burnishing of the wear pad 56 may be continued so as to dispose the transducer 60 at the burnished surface 58 of the wear pad 56. Stated another way, burnishing may proceed to the point where the initially embedded transducer 60 is exposed to the air gap between the slider 2 and disk 136 during disk drive operations. This provides a reduced pole-tip recession for the slider 2. In cases where an overcoat (e.g., carbon) is provided on the entirety of the lower surface 22 of the slider 2, the burnishing operation may be utilized to remove at least part of this overcoat, and possibly the entirety of that portion of the overcoat between the transducer 60 and the disk 136.

Figure 5:
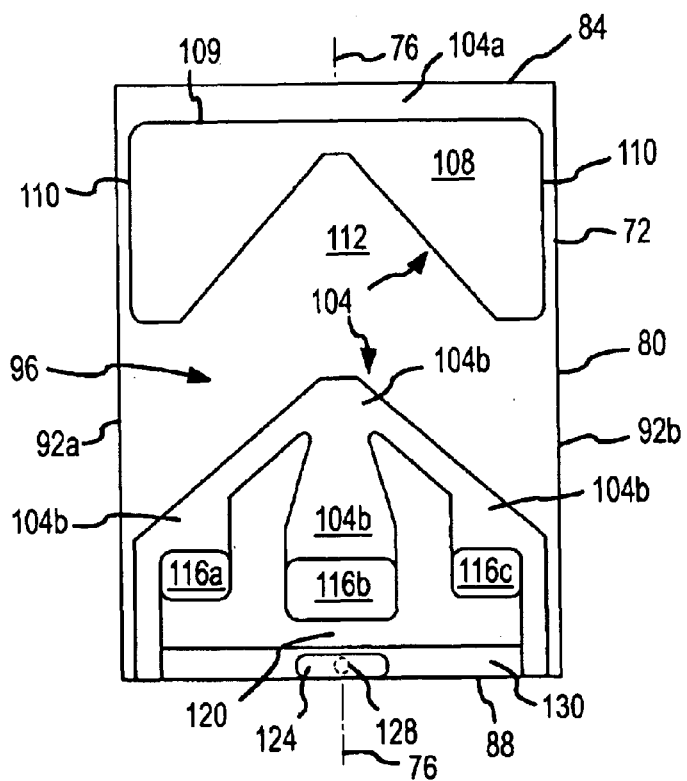
FIG. 5 is a bottom view of another embodiment of a slider which may be used by the disk drive FIG. 1, namely for a load/unload type design.

Another embodiment which is functionally the same as the slider 2 discussed above, but which is for the case where the disk drive 132 utilizes a load/unload-type design, is illustrated in FIG. 5 in the form of a slider 72. The slider 72 includes a slider body 80 which has a longitudinal extent along a central reference axis 76. Hereafter in relation to the slider 72, the term "longitudinal" or the like means in a direction which is parallel with this reference axis 76, while the term "lateral" or the like means a direction which is perpendicular with this reference axis 76. An at least generally rectangular configuration or profile is utilized by the slider body 80. In this regard, the slider body 80 includes: a leading edge 84 which is laterally extending; a trailing edge 88 which is laterally extending and which is longitudinally spaced from the leading edge 84 (i.e., spaced from the leading edge 84 along the reference axis 76); and a pair of sides 92a and 92b which are laterally spaced and extend longitudinally between the leading edge 84 and trailing edge 88. Orientations for the leading edge 84, the trailing edge 88, and the sides 92a, 92b which differ from that illustrated in FIG. 5 may be appropriate.

The slider body 80 includes a lower surface 96 which at least generally projects toward its corresponding disk 136 when installed in the disk drive 132. Features are incorporated in the design of the lower surface 96 of the slider 72 such that its fly height is significantly smaller than current state-of-the-art slider designs. Spacing between the slider 72 and the disk 136 is maintained during normal disk drive operations (e.g., reading/writing information from/to the disk 136) by including an air bearing surface or ABS system 100 on the lower surface 96 of the slider body 80. The ABS system 100 includes a front air bearing surface or ABS pad 108. The front ABS pad 108 is longitudinally spaced from the leading edge 84 and extends at least substantially from the side 92a to the side 92b. A small space is included between the front ABS pad 108 and each of the sides 92a, 92b for manufacturing purposes.

The profile of the front ABS pad 108 from a top view differs from the front ABS pad 34 used by the contact-start/stop design of FIGS. 2–4 presented above. The longitudinal extent of the front ABS pad 108 of the slider 72 is greater than that of the front ABS pad 34 of the slider 2. However, the entirety of the front ABS pad 108 is still disposed between the longitudinal midpoint of the slider body 80 (i.e., half-way between the leading edge 84 and trailing edge 88) and its leading edge 84. Another distinction is that the rear portion of the front ABS pad 108 includes an at least generally v-shaped portion whose apex projects toward the leading edge 84 of the slider body 80.

Air carried by the rotating disk 136 is directed under the front ABS pad 108 to exert an uplifting force thereon by an ABS step 104a. The ABS step 104a is disposed forward of the front ABS pad 108, or in the direction of the leading edge 84, such that the ABS step 104a is disposed between the leading edge 84 and the front ABS pad 108. The ABS step 104a is recessed relative to the front ABS pad 108 an amount such that the front ABS pad 108 will function as an air bearing surface. An ABS cavity 112 is defined by the at least generally v-shaped of the rear of the front ABS pad 108. Air which flows over the front to ABS pad 108 flows over the ABS cavity 112 to generate a negative pressure therein which may be used to have an effect upon and/or control the flight of the slider 72. Those portions of the lower surface 96 which defined the bottom of the ABS cavity 112 are recessed relative to the front ABS pad 108 an amount which is sufficient so as to allow the noted negative pressure to be generated therein.

A plurality of rear air bearing surface or ABS pads 116a–c are longitudinally spaced from the front ABS pad 108, and are separated therefrom by the ABS cavity 112. The rear ABS pad 116b is centrally disposed between the sides 92a and 92b of the slider body 80 (e.g., the reference axis 76 bisects the rear ABS pad 116b). The rear ABS pad 116a is laterally spaced from the rear ABS pad 116b in that it is disposed at least generally between the side 92a and the rear ABS pad 116b. Similarly the rear ABS pad 116c is laterally spaced from the rear ABS pad 116b in that it is disposed at least generally between the side 92b and the rear ABS pad 116b. The rear ABS pads 116a and 116c are slightly longitudinally spaced from the rear ABS pad 116b in the direction of the leading edge 84 to provide roll stiffness for the slider 72.

Air carried by the rotating disk 136 is directed under the rear ABS pads 116a, 116b, and 116c to exert an uplifting force thereon via a constant depth ABS step 104b. The leading portion of the ABS step 104b is disposed forward of each of the rear ABS pad 116a, 1166b, and 116c, or in the direction of the leading edge 84, such that the leading portion of the ABS step 104b is disposed between the leading edge 84 and each of the ABS pad 116a, 116b, and 116c. Three separate legs 141 of the ABS step 104b extend to the three rear wear pads 116a, 116b, and 116c. The ABS step 104b also extends longitudinally from the rear wear pads 116a and 116c to the trailing edge 88 of the slider body 80 in slightly spaced relation from the sides 92a and 92b of the slider body 80. No portion of the ABS step 104b extends rearwardly from the rear ABS pad 116b such that the ABS step 104b terminates at the ABS pad 116b. The ABS step 104b is recessed relative to the rear ABS pads 116a, 116b, and 116c by an amount such that the rear ABS pads 116a, 116b, and 116c each will function as an air bearing surface.

Located at least substantially at the trailing edge 88 of the slider body is a rear rail 130 The rear rail 130 is longitudinally spaced from each of the rear ABS pads 116a–c, extends laterally between the sides 92a and 92b, and is recessed relative to each of the front ABS pad 108 and the rear ABS pads 116a, 116b, and 116c. Centrally disposed on the rear rail 130 is a wear pad 124 which carries at least one transducer 128 for reading information from and/or writing information to the disk 136 in a manner known in the art (e.g, through sending signals between the transducer(s) 128 and the disk 136 such that there is an operative interface therebetween). The transducer 128 may be of the type discussed above in relation to the slider 2.

Prior to the initial operation of the disk drive 132, the wear pad 124 will be at least substantially co-planar with the rear ABS pads 116a–c and the front ABS pad 108 in the same manner discussed above in relation to the slider 2. Burnishing operations are executed on the wear pad 124 when the disk drive 132 is initialized so as to remove portions of the wear pad 124 in the same manner discussed above relation to the slider 2 as well. Therefore, preferably the wear pad 124 is formed from a softer material than those which formed the front ABS pad 108 and the rear ABS pads 116. The materials and hardness characteristics noted above in relation to the slider 2 may be 111 used by the slider 72 as well.

Substantially no uplifting forces are applied to the slider 72 by the wear pad 124 in the same manner and to the same extent as the slider 2. Therefore, at no time does the wear pad 124 function as an air bearing surface for the slider 72. This non-air bearing surface effect is provided by disposing a recess 120 between the wear pad 124 and the rear ABS pad 116b. One of the characteristics of the recess 120 that allows the wear pad 124 to initially be coplanar with the front ABS pad 108 and the rear ABS pads 116a–c, and yet still not exert any substantial uplifting forces on the slider 72 is the depth of the recess 120 or the degree of offset from the wear pad 124 and rear ABS pads 116a–c. Typically the depth of the recess 120 must be at least about 600 nm in order for the wear pad 124 to be a non-air bearing surface in the manner described herein. Other characteristics which at least contribute to the wear pad 124 being a non-air bearing surface is its small size which also reduces the time to burnish the same. In one embodiment, the wear pad 124 contributes no more than about 1–2% of the total lift forces exerted on the slider 72 when flying.

There are a number of other characteristics or features which are important in relation to the slider 72. One is the pitch angle at which the slider 72 is disposed when installed in the disk drive 132. The same pitch angle for the slider 72 will be selected based upon the same factors discussed above in relation to the slider 2. Another characteristic is that the rear ABS pads 116a–c and the wear pad 124 are disposed on the same half of the lower surface 96 of the slider body 80. Both the rear ABS pads 116a–c and the wear pad 124 are disposed between a longitudinal midpoint of the slider body 80 (i.e., half-way between the leading edge 84 and the trailing edge 88) and the trailing edge 88 of the slider body 80. The wear pad 124 and the rear ABS pad 116b are also disposed relatively close to each other and in the same discussed above in relation to the slider 2.

The above-described slider 2 and 72 each provide a reduced fly height in relation to the known prior art. In one embodiment, the fly height which may be achieved by the sliders 2 and 72 is no more than about 5 nm on a 4 nm disk glide—but not a fixed percentage in future disks (both the fly height and glide avalanche being measured relative to a reference plane 140 which corresponds with the mean of the surface roughness of the disk 136). It is common for current state-of-the art sliders to fly at a height of about 50 nanometers above the disk. This reduced fly height realized by the design of the sliders 2 and 72 may be used to take advantage of higher bit and/or track densities for the disk 136 of the disk drive 132. Less sensitivity to manufacturing and environment tolerances (e.g., step depths, cavity depths, suspension gram load, altitude, and temperature) are also realized by the design of the sliders 2 and 72 since the burnishing operation produces a customized surface of sorts for the interface between the wear pad with the transducer(s) therein and its corresponding rigid disk. Moreover, if for some reason there was some subsequent reduction in the fly height of the slider, the wear pad will simply be burnished an additional amount to once again established the desired small gap between the slider and the disk. It should be appreciated that other air bearing surface configurations/locations could be utilized for the sliders 7 and 72 as long as there was no substantial adverse effect on the noted burnishing of the wear pad as described herein. Moreover, principles discussed herein in relation to the sliders 2 and 72 are applicable to any disk drive which uses at least one rigid disk.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for making a disk drive comprising a disk and a slider, wherein said slider comprises a wear pad on a lower surface of said slider which at least generally projects toward said disk, said method comprising the steps of:

executing a first flying step comprising flying said slider above said disk a distance which is less than a glide height;

burnishing said wear pad during said executing a first flying step;

terminating said burnishing step; and executing a second flying step comprising flying said slider above said disk a distance which is greater than said glide height, wherein said executing a second flying step is executed after said terminating step, wherein said executing a first and second flying step each comprise rotating said disk wherein said executing a first flying step comprises disposing at least one air bearing surface on said lower surface of said slider and generating a lifting force on said slider using said at least one air bearing surface and said rotating step, wherein said executing a first flying step comprises providing contact between said disk and said wear pad during at least a portion of said rotating step, wherein said burnishing step comprises establishing a gap between an entirety of said disk and said slider for said executing a second flying step, and wherein said wear pad has substantially no effect on said generating step either before or after said burnishing step.

2. A method, as claimed in claim 1, wherein:
said lifting force is insufficient to dispose said slider above said disk a distance which is greater than said glide height before said burnishing step, wherein said lifting force is sufficient to dispose said slider above said disk a distance which is greater than said glide height after said burnishing step, and wherein a magnitude of said lifting forces is at least substantially the same for each of said executing first and second flying steps.

3. A method, as claimed in claim 1, wherein:
said executing a first flying step her comprises disposing a plurality of said air bearing surfaces on said lower surface of said slider in spaced relation.

4. A method, as claimed in claim 1, wherein:
said burnishing step comprises removing material from said wear pad.

5. A method, as claimed in claim 1, wherein:
said burnishing step comprises creating a first surface on said wear pad which is at least substantially co-planar with said disk at least during said executing a second flying step.

6. A method, as claimed in claim 1, wherein:
said wear pad is disposed on at least substantially a trailing edge of said slider, and wherein said burnishing step comprises disposing said slider at a pitch angle so as to provide contact between said wear pad and said disk during said executing a first flying step and further so as to dispose each said air bearing surface in spaced relation to said disk during said executing a first flying step.

7. A method, as claimed in claim 1, wherein:
said slider further comprises at least one transducer for operatively interfacing with said disk, wherein said least one transducer is embedded within said wear pad before said burnishing step, and wherein said burnishing step comprises removing sufficient portions of said wear pad to expose said at least one transducer to an air gap between said slider and said disk at least during said executing a second flying step.

8. A method, as claimed in claim 1, wherein:
said wear pad comprises an overcoat and at least one transducer embedded within said wear pad which operatively interfaces with said disk, and wherein said burnishing step comprises removing at least a portion of said overcoat between said at least one transducer and said disk.

9. A method, as claimed in claim 8, wherein:
said burnishing step comprises removing an entirety of said overcoat between said at least one transducer and said disk.

10. A method, as claimed in claim 1, further comprising the step of:
identifying when said slider is flying above said disk a distance which is greater than said glide height, wherein said terminating step is executed after said identifying step.

11. A method, as claimed in claim 1, wherein:
a total time period between said a start of said burnishing step and said terminating step is no more than about 60 minutes.

12. A method, as claimed in claim 1, wherein:
said slider further comprises at least one transducer for operatively interfacing with said disk, wherein said method further comprises the step of monitoring a signal between said least one transducer and said disk and basing said terminating step on said monitoring step.

13. A method, as claimed in claim 1, wherein:
said executing a second flying step is executed only after said terminating step.

14. A method, as claimed in claim 1, further comprising the step of:
releasing said disk drive for distribution, wherein said executing a first flying step, said burnishing step, and said terminating step are executed before said releasing step.

15. A method, as claimed in claim 1, wherein:
said executing a first flying step is performed a first time that said disk drive is operated.

16. A method for making a disk drive comprising a disk and a slider, wherein said slider comprises at least one transducer which operatively interfaces with said disk, and at least one air bearing surface and a wear pad on a lower surface of said slider which at least generally projects toward said disk, said method comprising the steps of:
initializing said disk drive, comprising the steps of:
rotating said disk relative to said slider;
exerting a lifting force on said slider using said rotating step of said initializing step and said at least one air bearing surface;
contacting said wear pad against said disk during at least a portion of said rotating step of said initializing step;
burnishing said wear pad using rotating and said contacting steps of said initializing step, wherein said wear and is disposed on at least substantially a trailing edge of said slider, and wherein said burnishing step comprises disposing said slider at a pitch angle so as to allow for said contacting step and further so as to dispose each said air bearing surface in spaced relation to said disk throughout said burnishing step; and
establishing a gap between said slider and an entirety of said disk at least at some point in time during said rotating step of said initializing step, wherein said establishing step comprises said burnishing step of said initializing step and said exerting step; and
executing at least one data transfer operation step after said initializing step, wherein said at least one data transfer operation step comprises:
rotating said disk relative to said slider;
providing at least substantially no burnishing of said wear pad during said rotating step of said at least one data transfer operation step;
maintaining a gap between said slider and said disk during at least a substantial portion of said rotating step of said at least one data transfer operation step; and
exchanging at least one signal between said at least one transducer and said disk during said maintaining step.

17. A method, as claimed in claim 16, wherein:
said rotating step of said initializing step comprises executing a first flying step comprising flying said slider above said disk a distance which is less than a glide height, and wherein said rotating step of said executing at least one data transfer operation step comprises executing a second flying step comprising flying said slider above said disk a distance which is greater than said glide height.

18. A method, as claimed in 17, claim wherein:

a magnitude of said exerting a lifting force is insufficient to dispose said slider above said disk a distance which is greater than said glide height before said burnishing step, and said magnitude of said exerting a lifting force is sufficient to dispose said slider above said disk a distance which is greater than said glide height after said burnishing step.

19. A method, as claimed in claim 17, wherein:

said executing a first flying step further comprises disposing a plurality of said air bearing surfaces on said lower surface of said slider in spaced relation.

20. A method, as claimed in claim 16, wherein:

said wear pad has substantially no effect on said exerting step either before or after said burnishing step.

21. A method, as claimed in claim 16, wherein:

said burnishing step comprises removing material from said wear pad.

22. A method, as claimed in claim 16, wherein:

said burnishing step comprises creating a first surface on said wear pad which is at least substantially co-planar with said disk at least during said executing at least one data transfer operation step.

23. A method, as claimed in claim 16, wherein:

said least one transducer is embedded within said wear pad before said burnishing step, and wherein said burnishing step comprises removing sufficient portions of said wear pad to expose said at least one transducer to an air gap between said slider and said disk at least for said executing at least one data transfer operations step.

24. A method, as claimed in claim 16, wherein:

said wear pad comprises an overcoat and at least one transducer embedded within said wear pad which operatively interfaces with said disk, and wherein said burnishing step comprises removing at least a portion of said overcoat between said at least one, transducer and said disk.

25. A method, as claimed in claim 24, wherein:

said burnishing step comprises removing an entirety of said overcoat between said at least one transducer and said disk.

26. A method, as claimed in claim 16, wherein:

a total time period between said a start of said burnishing step and said establishing step is no more than about 60 minutes.

27. A method, as claimed in claim 16, further comprising the step of:

identifying an occurrence of said establishing step.

28. A method, as claimed in claim 27, wherein:

said identifying step comprises monitoring a signal between said least one transducer and said disk and terminating said initializing step based upon said monitoring step.

29. A method, as claimed in claim 16, further comprising the step of:

releasing said disk drive for distribution, wherein said releasing step is executed only after said initializing step.

30. A slider for a disk drive which is of the flying type, comprising:

a slider body which extends along a reference axis which defines a longitudinal extent of said slider body, wherein said slider body comprises:

upper and lower surfaces, wherein said lower surface projects toward a storage medium of a disk drive when said slider is installed in said disk drive;

a leading edge and a trailing edge which is longitudinally spaced from said leading edge relative to said reference axis;

first and second sides which are laterally-spaced relative to said reference axis, wherein said lower surface of said slider body comprises:

a wear pad disposed at least substantially at said trailing edge;

a recess disposed in front of said wear pad, wherein said recess is disposed between said wear pad and said leading edge of said slider body, and wherein said recess has a depth of at least about 600 nm;

at least one transducer disposed in said wear pad; and an air bearing surface system, wherein said wear pad is separate from and not part of said air bearing surface system.

31. A slider, as claimed in claim 30, wherein:

said wear pad is disposed about 0.0004 inches from said trailing edge in a direction of said leading edge.

32. A slider, as claimed in claim 30, wherein:

said wear pad is at least substantially centrally disposed between said first and second sides of said slider body.

33. A slider, as claimed in claim 32, wherein:

adjacent portions of said lower surface of said bottom which encircle said wear pad are recessed from said wear pad.

34. A slider, as claimed in claim 30, wherein:

said wear pad is formed from a first material and said air bearing surface system is formed from a second material, wherein said second material has a greater hardness than said first material.

35. A slider, as claimed in claim 30, wherein:

said at least one transducer is selected from the group consisting of magneto resistive, giant magneto-resistive, collosal MR, and inductive.

36. A slider, as claimed in claim 30, wherein:

said air bearing surface system comprises a first air bearing surface, wherein a space between said first air bearing surface and said wear pad consists of a said recess.

37. A slider, as claimed in claim 30, wherein:

said air bearing surface system comprises a first air bearing surface, wherein said first air bearing surface and said wear pad are longitudinally spaced by a distance of no more than about 20 percent of a distance between said leading and tailing edges.

38. A slider, as claimed in claim 30, wherein:

said air bearing surface comprises a first air bearing surface, wherein said first air bearing surface and said wear pad are longitudinally spaced by a distance of about 5 percent of a distance between said leading and trailing edges.

39. A slider, as claimed in claim 30, wherein:

a first half of said lower surface extends from said leading edge of said slider body to a longitudinal midpoint of said slider body, wherein a second half of said lower surface extends from said longitudinal midpoint of said slider body to said trailing edge.

40. A slider, as claimed in claim 39, wherein:

said air bearing surface system comprises a first air bearing surface, wherein said first air bearing surface is longitudinally spaced and separate from said wear pad, and wherein both said wear pad and said first air bearing surface are disposed on said second half of said lower surface of said slider body.

41. A slider as claimed in claim 39, wherein:

said air bearing surface system comprises:
- a first air bearing surface that extends at least substantially from said first side of said slider body to said second side of said slider body, a further that is disposed on said first half of said lower surface of said slider body;
- a second air bearing surface that is at least substantially centrally disposed between said first and second sides of said slider body, and that is disposed no more than about 0.010 inches from said wear pad;
- a third air bearing surface that is at least generally disposed between said second air bearing surface and said first side of said slider body in spaced relation to each of said second air bearing surface and said first side of said slider body; and
- a fourth air bearing surface that is at least generally dispose between said second air bearing surface and said second side of said slider body in spaced relation to each of said second air bearing surface and said second side of said slider body.

42. A slider, as claimed in claim 41, wherein:

said first air bearing surface is disposed at least generally adjacent to said leading edge of said slider body and is at least generally rectangularly-shaped; and said lower surface comprises a step disposed in front of each of said first, second, third, and fourth air bearing surfaces.

43. A slider, as claimed in claim 41, wherein:

said lower surface comprises a cavity disposed between said first air bearing surface and said step associated with each of said second, third, and fourth air bearing surfaces.

44. A slider, as claimed in claim 41, wherein:

said slider is for a contact start/stop-type disk drive.

45. A slider, as claimed in claim 41, wherein:

said slider is for a load/unload-type disk drive.

* * * * *

UNITED STATES PATENT AND TRADEMARK OFFICE
CERTIFICATE OF CORRECTION

PATENT NO. : 6,707,631 B1
DATED : March 16, 2004
INVENTOR(S) : Haddock

It is certified that error appears in the above-identified patent and that said Letters Patent is hereby corrected as shown below:

<u>Column 15,</u>
Line 14, delete the word "forces", and insert therefor -- force --.

<u>Column 16,</u>
Line 36, delete the word "and", and insert therefor -- pad --.

<u>Column 17,</u>
Line 32, delete the word "operations", and insert therefor -- operation --;
Line 39, delete the comma "," after the word "one".

<u>Column 18,</u>
Line 43, delete the word "a";
Line 50, delete the word "tailing", and insert therefor -- trailing --.

Signed and Sealed this

Twenty-fifth Day of May, 2004

JON W. DUDAS
*Acting Director of the United States Patent and Trademark Office*